United States Patent [19]

Kurosaki

[11] 4,436,542

[45] Mar. 13, 1984

[54] PROCESS FOR THE PRODUCTION OF AN OPTICAL GLASS ARTICLE

[75] Inventor: Shiro Kurosaki, Osaka, Japan

[73] Assignee: Sumitomo Electric Industries, Ltd., Osaka, Japan

[21] Appl. No.: 301,896

[22] Filed: Sep. 11, 1981

[30] Foreign Application Priority Data

Sep. 16, 1980 [JP] Japan ............................ 55-127116
Nov. 27, 1980 [JP] Japan ............................ 55-167820

[51] Int. Cl.³ .................................................. C03B 19/06
[52] U.S. Cl. ............................................ 65/18.1; 65/17; 501/12
[58] Field of Search ............... 65/18.1, 30.13, 17, 65/134, 18.2, 30.1, 3.15, 31, 3.12, 18.3, 30.12, 3.11; 501/12, 900; 264/43; 156/663

[56] References Cited

U.S. PATENT DOCUMENTS

| | | | |
|---|---|---|---|
| 3,843,228 | 10/1974 | Yoshiyagawa et al. | 65/30.13 X |
| 4,059,658 | 11/1977 | Shoup et al. | 264/43 |
| 4,220,461 | 9/1980 | Samanta | 65/17 X |
| 4,239,519 | 12/1980 | Peall et al. | 65/30.13 X |
| 4,278,632 | 7/1981 | Yoldas | 501/12 |
| 4,302,231 | 11/1981 | Macedo et al. | 65/30.13 X |
| 4,326,869 | 4/1982 | Kurosaki et al. | 65/3.15 X |

FOREIGN PATENT DOCUMENTS 56-37234 4/1981 Japan ................................ 501/12

*Primary Examiner*—Kenneth M. Schor
*Attorney, Agent, or Firm*—Wenderoth, Lind & Ponack

[57] ABSTRACT

The present invention relates to a process for the production of an optical glass article, which comprises immersing a gelled body containing a compound capable of being converted into a dopant for increasing the refractive index of the glass, in a leaching liquor selected from the group consisting of water, aqueous solutions of weak acids, aqueous solutions of alkali metal salts, ketones and alcohols, leaching at least a part of the compound as ions out of the gelled body, optionally immersing the gelled body in an organic solvent, drying the body in a predetermined atmosphere, decomposing the compound, heating and firing the body at a high temperature and then heating and sintering it at a higher temperature.

22 Claims, No Drawings

PROCESS FOR THE PRODUCTION OF AN OPTICAL GLASS ARTICLE

BACKGROUND OF THE INVENTION

1. Field of the Invention

This invention relates to a process for the production of an optical glass article and more particularly, it is concerned with a process of economically making a high quality glass material having a three-dimensional refractive index distribution in the glass body, which can be used as a lens for a camera, precision optical device or optoelectronic instrument. In particular, this process is suitable for obtaining a rod lens having a refractive index which varies in the radius direction, as a lens of refractive index distribution type.

2. Description of the Prior Art

Rod lenses of graded type with a parabolic distribution of refractive index, whose refractive index gradually decreases from the center to the outside in the radius direction, have lately been used increasingly as optical parts in duplicating machines, facsimile devices and optical communications. These rod lenses are made of glass materials or plastic materials and some of them have been put to practical use ("Nikkei Electronics" 1979, 8/20, page 64–74 or "Kogyo Zairyo" 1980, Vol. 20, No. 10, page 85–96). In particular, Selfoc (trademark) lenses made by the ion exchange method using multicomponent glasses are well known.

However, such an ion exchange method is essentially limited by the diffusion speed of a network modifier ion, the role of which is to change the refractive index under such a temperature condition that glass itself is not deformed. Thus, a cation with a high diffusion speed should be used and for example, a monovalent cation such as Tl, Cs, Rb, K, Na or Li ion can only be used as the network modifier ion. Therefore, it is not easy to reduce the dispersion of the refractive index. Tl should be used for the purpose of increasing the differences of refractive indexes, but handling of Tl is difficult because of its poisonous character. Furthermore, when it is desired to obtain a rod lens with a large diameter, e.g. larger than 3 mm$\phi$, the ion exchange method is not suitable for practice on a commercial scale, since a long time is taken for ion exchange at a temperature at which glass is not deformed or broken.

In addition, the molecular stuffing method based on another principle has been proposed as a method whereby the above described disadvantage can be overcome. This method comprises immersing in a stuffing solution containing $CsNO_3$ or the like a porous glass prepared through steps of phase separation, leaching out and washing to precipitate $CsNO_3$ as a dopant in the micropores of the glass, and changing stepwise the concentration and temperature of the stuffing solution so that in the glass body, the concentration of $Cs_2O$ will be in a parabolic distribution from the center to the outside, as disclosed in Japanese Patent Application (OPI) Nos. 28339/1975, 12607/1976 and 102324/1978.

However, the above described molecular stuffing method has the disadvantage that in a porous glass obtained by the steps of phase separation, leaching out and washing, there are disorders of the concentration distribution of $Cs_2O$ and refractive index distribution due to the disorder of the pore diameter distribution, i.e. the growth of abnormality of connected micropores formed in the step of leaching-out. Since the porosity of such a porous glass is less than 50% and it is difficult to increase it, the difference of refractive indexes in a finally obtained glass body amounts to at most about 2.0% even if an aqueous solution of $CsNO_3$ with a high concentration is used. Accordingly, it has been eagerly desired to develop a porous glass having connected micropores with a desirable and uniform pore diameter distribution.

SUMMARY OF THE INVENTION

It is an object of the present invention to provide a process for producing an optical glass article with a high quality in economical manner.

It is another object of the present invention to provide a process for the production of a material for a lens, in particular, rod lens having a desired refractive index distribution without disorders thereof.

It is a further object of the present invention to provide a process for producing a glass material having a three dimensional refractive index distribution in the glass body by the use of a porous glass.

It is a still further object of the present invention to provide an inexpensive lens with a desired size.

These objects can be attained by a process for the production of an optical glass article, which comprises immersing a gelled body containing a compound capable of being converted into a dopant for increasing the refractive index of the glass, in a leaching liquor selected from the group consisting of water, aqueous solutions of weak acids, aqueous solutions of alkali metal salts, ketones and alcohols, dissolving at least a part of the compound as ions out of the body, optionally immersing the body in an organic solvent such as ethanol or propanol, drying the body in a predetermined atmosphere, decomposing the compound, heating and firing the body at a further high temperature and then heating and sintering the body at a still further high temperature.

DETAILED DESCRIPTION OF THE INVENTION

In the present invention, an optical glass article, in particular, a rod lens with a refractive index varied in the radius direction is produced using the silica gel method.

As a method of preparing a porous glass, there are the vycor method, zeolite method, white carbon method, colloidal silica method and silica gel method. This silica gel method is classified into a method comprising adding an acid to an aqueous solution of sodium silicate, stirring vigorously at a low temperature to form a silica hydrogel, gelling, forming and then leaching, and another method comprising adding an organic compound capable of undertaking the Cannizzaro reaction to a solution of a silicate, stirring, heating somewhat to forward the reaction gradually, gelling, forming and leaching. The former method is described in, for example, Japanese Patent Application (OPI) No. 116615/1980 and the latter method is described in, for example, U.S. Pat. Nos. 3,678,144, 3,782,982, 3,827,893 and 4,059,658, and Japanese Patent Application (OPI) Nos. 115191/1979 and 119512/1980.

According to the present invention, a transparent optical glass article is produced by first forming a gelled body containing a compound capable of being converted into a dopant for changing the refractive index, leaching the gelled body so that the concentration of the compound capable of being converted into a dopant is regularly changed through diffusion or ion exchange, during the same time, controlling the leaching liquor and temperature thereof to control the diffusion or ion exchange speed or the solubility of the compound and to distribute the compound so that a parabolic distribution of refractive index is obtained, stopping the leaching at the midpoint of the leaching to retain the compound and to obtain the gelled body with a predetermined concentration distribution of the compound, and finally sintering the gelled body.

In the present invention, the following three methods (A), (B) and (C) are employed for forming the gelled body.

(A) $Tl_2O$, $Cs_2O$, $Rb_2O$ and the like are chosen as a dopant for increasing to a great extent the refractive index in the interior of glass. To this end, a silicate solution containing at least one of thallium silicate, cesium silicate and rubidium silicate is neutralized with an acid.

(B) $Tl_2O$, $Cs_2O$, $Rb_2O$ and the like are chosen as a dopant for increasing to a great extent the refractive index in the interior of glass. To this end, at least one watersoluble compound capable of being converted into an oxide, for example, a thallium compound such as thallium nitrate, a cesium compound such as cesium nitrate or a rubidium compound such as rubidium nitrate is added to an aqueous solution of silicic acid or ammonium silicate, and the pH of the solution is controlled.

(C) $Tl_2O$, $Cs_2O$, $Rb_2O$ and the like are chosen as a dopant for increasing to a great extent the refractive index in the interior of glass. To this end, a silicate solution containing at least one of thallium silicate, cesium silicate and rubidium silicate is subjected to the Cannizzaro reaction.

One embodiment of the present invention as to the above described method (A) will now be illustrated in more detail:

A true solution, colloidal solution or suspension is prepared containing at least one of cesium silicate, rubidium silicate and thallium silicate optionally with any of quaternary ammonium silicate, colloidal silica, lithium polysilicate, sodium silicate and potassium silicate.

The quantity of $SiO_2$ contained therein should be in the range of 0.1 to 0.6 mol/l, since if less than 0.1 mol/l, the gelled body is too weak, while if more than 0.6 mol/l, the reaction with an acid is too vigorous.

The above described aqueous solution or suspension can be prepared, for example, by using 6.8 wt % $Na_2O$-25 wt % $SiO_2$-balance $H_2O$ as an aqueous solution of sodium silicate, 8.3 wt % $K_2O$-20.8 wt % $SiO_2$-balance $H_2O$ as an aqueous solution of potassium silicate, 2.1 wt % $Li_2O$-20 wt % $SiO_2$-balance $H_2O$ as an aqueous solution of lithium polysilicate, 9.9 wt % quaternary ammonium ion-45 wt % $SiO_2$-balance $H_2O$ as an aqueous solution of quaternary ammonium silicate, 40 wt % $SiO_2$-balance $H_2O$ as an aqueous solution of colloidal silica, 10.5 wt % $Rb_2O$-20 wt % $SiO_2$-balance $H_2O$ as an aqueous solution of rubidium silicate, 12 wt % $Cs_2O$-20 wt % $SiO_2$-balance $H_2O$ as an aqueous solution of cesium silicate and 14 wt % $Tl_2O$-20 wt % $SiO_2$-balance $H_2O$ as an aqueous solution of thallium silicate, which are suitably diluted as occasion demands.

The thus prepared aqueous solution of an alkali silicate is added to a dilute acid with agitation. As a weak acid there are used dilute $H_2SO_4$, dilute HCl, dilute $HNO_3$ and aqueous solution of $H_3BO_3$, $H_3PO_4$ and $Al_2(SO_4)_3$. Addition of the aqueous solution is carried out by pouring slowly with vigorous agitation at first, but in the latter half, it is carried out at once. At this time, pH is ordinarily about 4.4. Thereafter, the mixture is heated somewhat for several minutes and allowed to stand, thus gelling.

For obtaining a gelled body with a predetermined shape, a gelled body can be subjected to working, for example, cutting or a dilute acid is previously charged in a vessel with a predetermined shape to which an alkali silicate is added with agitation, or a mixture obtained previously by mixing and stirring can be poured directly in a vessel with a predetermined shape. If necessary, such a gelled body can be allowed to stand, for example, for three days and nights so as to complete the gelling, and is then washed with aqueous ammonia so as to neutralize the residual dilute acid.

Leaching of the gelled body is ordinarily carried out at a temperature of from room temperature to the boiling point for example 40° to 100° C., in water, alcohol, ketone, an organic acid such as formic acid or acetic acid, an inorganic acid such as HCl, $H_2SO_4$, $HNO_3$ and $H_2CO_3$ or a mixture thereof. For example, a mixture of 1–5% $HNO_3$+95–99% $C_2H_5OH$ or $1MNH_4NO_3$ can be used.

$Tl^+$, $Cs^+$ or $Rb^+$ is leached out of the gelled body toward the outside and organic materials are leached slowly. When this leaching is stopped in the middle thereof, the concentration of $Tl^+$, $Cs^+$ or $Rb^+$ is high at the central part of the body and is low at the outside of the body. When the leaching is carried out using an aqueous solution of $NH_4OH$ at a high temperature, a lot of time is required, but $Tl^+$, $Cs^+$ or $Rb^+$ is ion exchanged with $NH_4^+$, resulting in a high concentration of $Tl^+$, $Cs^+$ or $Rb^+$ at the central part and a low concentration at the outside of the body. Alternatively, in the above described leaching step, $Tl^+$, $Cs^+$ or $Rb^+$ ion can be ion-exchangeably leached outward by the use of an aqueous solution of MX wherein M={Li, Na, K} and X={$NO_3$, $(SO_3)_{\frac{1}{2}}$, $(CO_3)_{\frac{1}{2}}$, etc.} and during the same time, $Li_2O$, $Na_2O$ or $K_2O$ which does not substantially increase the refractive index can be allowed to be present less at the central part and more at the outside of the body.

The thus treated gelled body is slowly dried in vacuum, for example at 0° to 50° C., or it is subjected to permeation with a solution with a low solubility of $Tl^+$, $Cs^+$ or $Rb^+$ at a low temperature, for example, a solution of PrOH at 0° C. to stop movement of $Tl^+$, $Cs^+$ or $Rb^+$ and then dried, after which the temperature is gradually raised and organic materials are oxidized and fired. Thus, the solvent such as water or alcohol in the micropores is evaporated and dried by gradual pressure reduction or by slowly lowering the partial pressure of steam in a steam atmosphere. Furthermore, the gelled body is heated to, e.g. 500° to 650° C., to decompose the dopant, and is then heated in dry air or an oxygen atmosphere under reduced pressure by slowly raising the temperature to e.g. 650° to 900° C. to evaporate or fire organic compounds and further heated at a higher temperature, e.g. 900° to 1450° C., for example in vacuum, He or (He+$O_2$), to collapse the micropores under surface tension, thus forming a transparent glass.

In the above described process, the concentration distribution when the ions such as $Tl^+$, $Cs^+$, $Rb^+$ and the like are leached out depends on the shape of the gelled body, the porosity and pore size, the ambient liquid and the temperature conditions. As to the shape, a mixture of a solution of a silicate and dilute acid, mixed and stirred well, is poured in a vessel having a desired shape, for example, a cylindrical plastic vessel, followed by gelling, thus obtaining a gelled body having a desired shape, or a previously gelled body is subjected to working, for example, by grinding into a cylindrical shape or polishing, thus obtaining a gelled body having, for example, a rod shape before leaching. In addition, as a method of obtaining a predetermined shape, there can be used any one of casting, drawing, pressing, rolling and mechanical working.

The porosity and pore size vary with the kind of alkali metal silicate, the ratio thereof to a dilute acid, the ratio of $SiO_2$ to water and the ratio of $R_2O/SiO_2$. In addition to the alkali metal silicates set forth above, silicates of Mg, Ca, Sr, Ba, etc. can be added to a solution of a silicate in such a range that the solution is stable and the foregoing conditions are not disordered.

As to the ambient liquid, $Al_2O_3$, $TiO_2$, $SiO_2$, $ZrO_2$, C, SiC, $Si_3N_4$, $U_2O_5$, $Cr_2O_3$, $Fe_2O_3$, CoO, NiO, MnO, CuO, salts of Nd and Sm, and other oxides and compounds can be added, as a dispersing agent, to a solution of a silicate, but it is required that the dispersing agent have a size of at most 70 microns and is added in a proportion of 70% or less. In particular, glass bodies prepared by adding compounds of Nb and Sm can be used as a material for a laser.

As to the temperature condition, it is preferable for the distribution of $Tl^+$, $Cs^+$ or $Rb^+$ that a high temperature is applied in a short time. However, the present invention is not limited thereby.

Another embodiment of the present invention as to the above described method (B) will now be illustrated in more detail:

Firstly, an aqueous acidic solution of silicic acid or ammonium silicate is prepared. An alkaline aqueous solution of ammonium silicate can be used as it is. As well known in the art, an aqueous solution of silicic acid can for example be prepared as follows. A commercially sold aqueous solution of sodium silicate (e.g. containing 25% of $SiO_2$ and having an $SiO_2/Na_2O$ weight ratio of 3.68) is passed through a cation exchange resin, for example, a sulfonated styrene copolymer of hydrogen type such as Rexyn 101, R 231 Cation Exchange Resin to thus obtain an aqueous silicic acid with a pH of 2 to 3. As well known in the art, an aqueous solution of ammonium silicate can for example be prepared as follows. A commercially sold aqueous solution of sodium silicate is passed through a cation exchange resin of $NH_4^+$ type to thus obtain an alkaline aqueous solution of ammonium silicate. For the preparation of an acidic aqueous solution of ammonium silicate, the acidification is effected by the use of hydrochloric acid or carbon dioxide gas. Then, a compound capable of being converted into an oxide dopant for changing the refractive index, for example, cesium nitrate ($CsNO_3$) is dissolved therein in a predetermined quantity. In the case of preparing a rod-shaped lens, for example, $(Cs_2O)/(SiO_2)+(Cs_2O)$ is determined correspondingly to a difference between the refractive index of the center of the rod and that of the surrounding surface of the rod and thus $(CsNO_3)/(SiO_2)$ is determined. As such a compound in the case of Cs there can be used various compounds such as $Cs_2SO_3$, $Cs_2CO_3$ and the like besides $CsNO_3$, but neutral compounds are preferable.

The variety and concentration of such a compound as not taking part in the refractive index as well as the variety and concentration of a compound becoming a dopant capable of changing the refractive index have large influences upon the porosity, pore size and the concentration of silica or the ratio to silica. Therefore, in order to enlarge the porosity and pore size and to effect leaching at a high speed for example, it is desirable to add a compound of this type with a relatively large ratio to silica.

When using an acidic solution containing silicic acid, an alkaline aqueous solution, for example, 1M $NH_4OH$ solution is added to the acidic solution to adjust the pH to 4–6, for example, pH=5.0. At room temperature, a hard solid gel starts to precipitate from the solution in a relatively short time, i.e. 30 minutes or less. When using an alkaline solution containing silicic acid, an acidic aqueous solution, for example, 1N $HNO_3$ is added to the alkaline solution to adjust the pH to 4–6 (with formation of $NH_4NO_3$ in dissolved state). At this time, gelling proceeds followed by aging at a certain temperature in suitable time, for example, at room temperature for 24 hours. A gelled body with a skeleton of porous silica obtained by the above described gelling is subjected to leaching with water, alcohols, ketones, organic acids, inorganic acids or their mixtures at a temperature ranging from room temperature to the boiling point to remove the excess compound or salt as described above. In this case, for example, a mixture of 1–5% $HNO_3$+95–99% $C_2H_5OH$ or 1M $NH_4NO_3$ can be used as a leaching solution. In this leaching step, the ions of the compounds, for example, $Tl^+$, $Cs^+$ or $Rb^+$ are gradually leached out from the outside of the gelled silica and other ions, if any, are also leached out. The leaching speed depends on the variety of ion and in particular, organic materials are leached slowly. When this leaching is stopped in the middle thereof, the concentration of the ion of the compound, for example, $Tl^+$, $Cs^+$, $Rb^+$ or the like is high at the central part and is low at the outside of the body because of the process of the leaching. This concentration distribution is in a parabolic distribution according to the diffusion equation, which gives a parabolic distribution of refractive index when the glass body is formed. The thus treated gelled body is slowly dried in vacuum, or it is subjected to permeation with a solution with a low solubility of $Tl^+$, $Cs^+$ or $Rb^+$ at a low temperature, for example, a solution of PrOH at 0° C. to stop movement of the compound, i.e. $Tl^+$, $Cs^+$ or $Rb^+$ and then dried, after which the temperature is gradually raised and organic materials are oxidized and fired.

Alternatively, in the above described leaching step, the ion of the compound, for example, $Tl^+$, $Cs^+$ or $Rb^+$ can be ion-exchangeably leached by the use of an aqueous solution of MX wherein $M=NH_4$, Li, Na, H etc. and $X=NO_3$, $(SO_3)_{\frac{1}{2}}$, $(CO_3)_{\frac{1}{2}}$, Cl, etc. In this case, those which do not substantially increase the refractive index, for example, $Li_2O$, $Na_2O$, $K_2O$, $B_2O_3$, $P_2O_5$, etc. are allowed to be present less at the central part and more at the outside of the body, as a dopant.

In the above described leaching step, leaching of the ion of the compound, for example, $Tl^+$, $Rb^+$ or $Cs^+$ or the ion exchange is accelerated from the inside to the outside of a gelled body by changing stepwise the concentration or temperature of the leaching solution, to thus control the concentration distribution so that the concentration of the above described dopant is gradually decreased from the central part to the outside of the gelled body and to give a parabolic distribution of refractive index thereto. Other types of concentration distribution can optionally be obtained.

After a compound capable of being converted into a dopant for changing at least the refractive index is leached to give a concentration distribution as set forth above, the solvent such as water or alcohol in the micropores is evaporated and dried by gradual pressure reduction or by slowly lowering the partial pressure of steam in a steam atmosphere. Furthermore, the gelled body is heated in an oxygen atmosphere by slowly raising the temperature to evaporate or burn organic compounds if any, and further heated at a higher temperature, e.g. 900° to 1450° C. to collapse the micropores under surface tension, thus forming a transparent glass.

In the above described process, the concentration distribution, when the ions of the compounds capable of being converted into dopant changing the refractive index, such as $Tl^+$, $Cs^+$, $Rb^+$ and the like are taken out, depends on the shape of the gelled body, the porosity and pore size, the ambient liquid and the temperature conditions. As to the shape, gelling is carried out in a vessel having a desired shape, for example, a cylindrical plastic vessel to obtain a gelled body having a desired shape, before leaching, or a previously gelled body is subjected to working, for example, by grinding into a cylindrical shape or polishing, thus obtaining a gelled body having, for example, a rod shape before leaching. In addition, as a method of obtaining a predetermined shape, there can be used any one of casting, drawing, pressing, rolling and mechanical working.

The porosity and pore size, after the leaching is completed, vary with the ratio of the compound to silica, the concentration of silica and the variety and concentration of an organic compound. For example, the use of a solution containing an increased quantity of $SiO_2$ and a decreased quantity of the compound, e.g. $CsNO_3$ or $NH_4Cl$ results in a tendency of lowering the pore size and porosity. From the standpoint of the concentration of a solution, the pore size is decreased and the uniformity is improved by diluting it with water, but the gel strength is lowered when gelled. When the concentration of an organic compound is increased, on the contrary, the pore size is decreased, but the porosity is increased.

In addition to the above described dopants, $Al_2O_3$, $TiO_2$, $SiO_2$, $ZrO_2$, C, SiC, $Si_3N_4$, $V_2O_5$, $Cr_2O_3$, $Fe_2O_3$, CoO, NiO, MnO, CuO, salts of Nd and Sm, and other oxides and compounds can be added to a solution of a silicate, as a dispersing agent, but it is required that the dispersing agent has a size of at most 70 microns and is added in a proportion of 70% or less. In particular, glass bodies prepared by adding compounds of Nd and Sm can be used as a material for a laser. In addition to the alkali metal silicates set forth above, solutions of silicates of Mg, Ca, Sr and Ba can be added to a solution of a silicate in such a range that the foregoing conditions are not disordered.

A further embodiment of the present invention as to the above described method (C) will now be illustrated in more detail:

The silica gel method comprises using an alkali metal silicate, quaternary ammonium silicate and colloidal silica as a starting material, preparing a solution with a predetermined condition from the starting material and then adding thereto a gelling agent to aggregate silica and to obtain a porous silica. The feature of the present invention consists in using, in this silica gel method, a true solution, colloidal solution or suspension containing at least one of cesium silicate, rubidium silicate and thallium silicate optionally with any of quaternary ammonium silicate, colloidal silica, lithium polysilicate, sodium silicate and potassium silicate, as the silicate solution.

The quantity of $SiO_2$ in the above described solution is adjusted in conventional manner to 1 to 12 mol/l since if less than 1 mol/l, the gelled porous body is too weak, while if more than 12 mol/l, it exceeds the solubility of $SiO_2$. The pH is generally adjusted to 10 to 15.

The above described aqueous solution can be prepared, for example, by using 6.8 wt % $Na_2O$-25 wt % $SiO_2$-balance $H_2O$ as an aqueous solution of sodium silicate, 8.3 wt % $K_2O$-20.8 wt % $SiO_2$-balance $H_2O$ as an aqueous solution of potassium silicate, 2.1 wt % $Li_2O$-20 wt % $SiO_2$-balance $H_2O$ as an aqueous solution of lithium polysilicate, 9.9 wt % quaternary ammonium ion-45 wt % $SiO_2$-balance $H_2O$ as an aqueous solution of quaternary ammonium silicate, 40 wt % $SiO_2$-balance $H_2O$ as an aqueous solution of colloidal silica, 10.5 wt % $Rb_2O$-20 wt % $SiO_2$-balance $H_2O$ as an aqueous solution of rubidium silicate, 12 wt % $Cs_2O$-20 wt % $SiO_2$-balance $H_2O$ as aqueous solution of cesium silicate and 14 wt % $Tl_2O$-20 wt % $SiO_2$-balance $H_2O$ as an aqueous solution of thallium silicate. For the preparation of the above described silicate solution using these solutions, it is desirable, in order to make the pore diameters, pore distribution and porosity uniform, to control, for example, the ratio of a solution of rubidium silicate, cesium silicate or thallium silicate to a solution of quaternary ammonium silicate in a range of 5:1 to 1:19 by weight based on the compounds and the ratio thereof to colloidal silica in a range of 20:1 to 1:4 by weight based on the compounds.

To the solution is then added in conventional manner an organic compound capable of undertaking the Cannizzaro reaction as a gelling agent, such as, for example, formaldehyde, formamide, paraformaldehyde, glyoxal, ethyl acetate, ethyl formate, methyl formate, methyl acetate or the like, mixed with agitation to forward the reaction slowly, and the pH is uniformly lowered to polymerize silica or to cause phase separation or gelling in the solution. During the same time, it is required that the molar ratio of the organic materials except formamide and alkali metal oxides ($R_2O$) such as $Tl_2O$, $Cs_2O$ and $Rb_2O$ is 2 to 13 and the molar ratio of formamide and $R_2O$ is 0.67 to 13, since if less than the lower limits (2 or 0.67), gelling is not sufficient and there is only obtained a gelled body which may break in the subsequent leaching step, while if more than the upper limit (13), an uncontrollable gelling takes place in a moment. When the organic material is added in a diluted form, the quantity of $SiO_2$ in the whole solution should not be less than 1 mol/l.

The above described gelling temperature may be between the freezing point and the boiling point of the reaction solution, but when the reaction is carried out near the freezing point, 720 hours or more is taken for the completion of gelling, while several seconds is only taken near the boiling point. Therefore, gelling should be carried out at a temperature of 40° to 100° C. so that the gelling is completed practically for several minutes to 24 hours. Such a gelling gives a linear contraction of 3 to 30% and when the concentration of an organic compound is high, volume change is small.

A porous silica obtained by the above described gelling is leached with water, alcohol, ketone, organic acids, inorganic acids or mixtures thereof at a temperature ranging from room temperature to the boiling point of the leaching solution to remove the excess alkali silicates. In this case, for example, a mixture of 1-5% $HNO_3$ + 95-99% $C_2H_5OH$ or 1M $NH_4NO_3$ can be used as a leaching solution. In this leaching step, $Tl^+$, $Cs^+$ or $Rb^+$ is gradually leached out of the outside of the gelled silica and other alkali ions, if any, are also leached out. The leaching speed depends on the variety of the ion and in particular, organic materials are leached slowly. When this leaching is stopped in the middle thereof, the concentration of $Tl^+$, $Cs^+$ or $Rb^+$ is high at the central part and is low at the outside of the body because of the process of the leaching. The thus treated gelled body is slowly dried in vacuum, or it is subjected to permeation with a solution with a low solubility of $Tl^+$, $Cs^+$ or $Rb^+$ at a low temperature, for example, a solution of PrOH at 0° C. to stop movement of $Tl^+$, $Cs^+$ or $Rb^+$, and is then dried, after which the temperature is gradually raised and organic materials are oxidized and burned.

Alternatively, in the above described leaching step, $Tl^+$, $Cs^+$ or $Rb^+$ ion can be ion-exchangeably leached by the use of an aqueous solution of MX wherein M=Li, Na, H and X=$NO_3$, $(SO_3)_{\frac{1}{2}}$, $(CO_3)_{\frac{1}{2}}$, etc. as a leaching solution. In this case, those which do not substantially increase the refractive index, for example, $Li_2O$, $Na_2O$ and $K_2O$ are allowed to be present less at the central part and more at the outside of the body, as a dopant.

In the above described leaching step, leaching of $Tl^+$, $Rb^+$ or $Cs^+$ or the ion exchange is accelerated from the inside to the outside of a gelled body by controlling the concentration or temperature of the leaching solution in certain conditions, thus control the concentration distribution so that the concentration of the above described dopant is gradually decreased from the central part to the outside of the gelled body and to give a parabolic distribution of refractive index thereto. Other types of concentration distribution can optionally be obtained.

After the above described leaching step, the solvent such as water or alcohol in the micropores is evaporated and dried by gradual pressure reduction or by slowly lowering the partial pressure of steam in a steam atmosphere. Furthermore, the gelled body is heated in an oxygen atmosphere by slowly raising the temperature to evaporate or to burn organic compounds, and further heated at a higher temperature, e.g. 900° to 1450° C. to collapse the micropores under surface tension, thus forming a transparent glass.

In the above described process, the concentration distribution when the ions such as $Tl^+$, $Cs^+$, $Rb^+$ and the like are taken out depends on the shape of a gelled body, the porosity and pore size thereof, the ambient liquid and the temperature conditions. As to the shape, a mixture of a silicate solution and an organic compound mixed and stirred well is poured in a vessel having a desired shape, for example, a cylindrical plastic vessel, followed by gelling, thus obtaining a gelled body having a desired shape before leaching, or a previously gelled body is subjected to working, for example, by grinding into a cylindrical shape or polishing, thus obtaining a gelled body having, for example, a rod shape before leaching. In addition, as a method of obtaining a predetermined shape, there can be used any one of casting, drawing, pressing, rolling and mechanical working. The porosity and pore size, after the leaching is completed, vary with the ratio of various alkalies to silica, the concentration of silica and the variety and concentration of an organic compound. For example, the pore size may be 2000 Å to several microns in the case of using a solution of rubidium silicate only, 100 Å or less in the case of using colloidal silica only, 200 Å or less in the case of using a solution of quaternary ammonium silicate only, and a mean value of 100 to 2000 Å in the case of using their mixtures. The porosity ranges from 30% to 90%. The use of a solution containing an increased quantity of $SiO_2$ and a decreased quantity of an alkali results in a tendency of lowering the pore size and porosity. From the standpoint of the concentration of a solution, the pore size is decreased and the uniformity is improved by diluting it with water, but the gel strength when gelled is lowered. When the concentration of an organic compound is increased, the pore size is decreased, but the porosity is increased.

In addition to the above described dopants, $Al_2O_3$, $TiO_2$, $SiO_2$, $ZrO_2$, C, SiC, $Si_3N_4$, $V_2O_5$, $Cr_2O_3$, $Fe_2O_3$, CoO, NiO, MnO, CuO, salts of Nd and Sm, and other oxides and compounds can be added to a solution of a silicate, as a dispersing agent, but it is required that the dispersing agent has a size of at most 70 microns and is added in a proportion of 70% or less. In particular, glass bodies prepared by adding compounds of Nd and Sm can be used as a material for a laser. In addition to the alkali metal silicates set forth above, solutions of Mg, Ca, Sr and Ba silicates can be added in such a range that the foregoing conditions are not disordered.

According to the process of the present invention, there can be obtained the advantages or merits summarized below:

(1) A large porous glass article having a desired shape can be produced by effecting gelling in a large vessel.

(2) An inexpensive article can be produced because of inexpensive raw materials and a relatively simple and controllable process.

(3) Since uniform mixtures of alkali metal silicate solutions, uniform mixtures of solutions of silicic acid containing alkali metal compounds or uniform mixtures of solutions of silicic acid and organic materials are gelled, phase separation takes place uniformly resulting in a glass article in which disorder of the refractive index is suppressed.

(4) By controlling the liquid composition and temperature condition around a spherical or cylindrical article, there can be obtained a glass article in which the dopant concentration for a high refractive index is decreased outward or the dopant concentration for a low refractive index is increased outward, and the distribution of refractive index is lowered with a predetermined curve outward. In particular, where the distribution of refractive index is lowered in the form of a parabolic distribution outward, a material for a rod lens of self-convergence type can be produced.

(5) Dopants in suitable amounts are distributed while keeping the refractive index in a desired form and dispersion of the refractive index can be decreased by using $Tl_2O$, $Cs_2O$ and $Rb_2O$ as a dopant for a higher refractive index, $B_2O_3$ and F as a dopant for a lower refractive index and $Li_2O$, $Na_2O$ and $K_2O$ as a dopant for an intermediate refractive index.

(6) An Nd- or Sm-doped glass suitable for use as a material for a laser can be produced by adding a compound of Nd or Sm to a solution of a silicate.

The following examples are given in order to illustrate the present invention in more detail without limiting the same, in which percents are to be taken as those by weight unless otherwise indicated.

EXAMPLE 1

An aqueous solution containing $R_2O$ {$Cs_2O$, $Rb_2O$, $Tl_2O$} and $SiO_2$, for example, 500 ml of a solution of water glass with $SiO_2/R_2O=3.2$ and $SiO_2=0.2$ g/ml was diluted with 1000 ml of water at a temperature of 5° C. while a dilute acid, for example, 245 ml of 4N HCl was diluted with 300 ml of water at a temperature of 5° C.

The diluted solution of water glass was, with agitation, added to the dilute acid and in 2 minutes, gelling took place at pH=6.3. The gelled body was solidified in about 30 to 60 minutes and then formed in a desired shape, for example, a rod with a diameter of 2 cm by cutting. In another case, the solution, immediately after being mixed under agitation, was cast in a vessel with a desired shape, followed by gelling.

The thus obtained gelled body was washed with 1N $NH_4NO_3$ or $(NH_4)_2SO_4$ in a 3l Büchner funnel for 2 hours, dried, for example, by heating at 150° C. for 4 hours and finally fired at 1100° C. by raising the temperature gradually. Thus, a finished product of $R_2O$-doped preform, for example, with a rod shape was obtained.

EXAMPLE 2

An aqueous solution containing $R_2O$ {$Cs_2O$, $Rb_2O$, $Tl_2O$} and $SiO_2$, for example, 1130 ml of a solution of water glass with $SiO_2/R_2O=2.1$ and $SiO_2O=0.38$ g/l was diluted with water to 3000 ml, while 160 g of $Al_2(SO_4)_3 \cdot 18H_2O$ was dissolved in 90 ml of 3N $H_2SO_4$ and diluted with water to 3000 ml.

The diluted solution of water glass was, with agitation, added to the dilute acid in such a manner that the addition was carried out slowly at first and the latter half was completed at once at a pH of 4.4, followed by heating and gelling in several minutes. A gelled body with a desired shape was obtained by casting the solution in a vessel with a desired shape or by working or forming a gelled material. The thus obtained gelled body was allowed to stand for three days and nights if necessary, allowed to stand in 10 l of a 1% aqueous solution of $NH_4OH$ for one day and night, heated in 12 to 15 l of a 10% aqueous solution of $NH_4OH$ at 70° C. for several hours, dried for example by heating at 120° to 150° C., and finally fired at 1000° to 1100° C. for 2 to 6 hours by heating gradually, thus forming a preform consisting of $R_2O$-doped 5.3% $Al_2O_3$-94.7% $SiO_2$.

EXAMPLE 3

A mixture of a quaternary ammonium silicate solution consisting of 10% $NH_4^+$-45% $SiO_2$-balance $H_2O$ and a cesium silicate solution consisting of 12% $Cs_2O$-20% $SiO_2$-balance $H_2O$ in a proportion of 30 volume % - 70 volume % was prepared, diluted with water by 10 times, added to a 30% aqueous solution of $H_2SO_4$, stirred and then poured in a cylindrical teflon vessel of 20 mm$\phi \times$50 mmH. After allowed to stand at room temperature for one night, a gelled body of 17 mm$\phi \times$45 mmH was taken out of the vessel, leached at 50° C. for 3 hours with 1M $NH_4NO_3$ containing 5 wt % of $(NH_4)_2B_4O_7$, immediately immersed in a solution of PrOH at 0° C., allowed to stand for one night, then dried gradually under reduced pressure, gradually heated up to 600° C. while a mixed gas of 80 volume % He - 20 volume % $O_2$ flowed around the body after the temperature exceeded 100° C., and further heated up to 1100° C. to thus obtain a transparent glass rod of 10 mm$\phi$. The resulting glass rod was drawn into a rod of 2 mm$\phi$, cut in a length of $\frac{1}{4} \times$(pitch length) and polished to prepare a rod lens. For the assessment of the light-condensing property, this rod was inserted in between a fiber and large core diameter fiber of NA=0.15 to examine its insertion loss, which was less than 2 dB.

EXAMPLE 4

The procedure of Example 3 was repeated except that 1M $NH_4NO_3$ solution containing 30% of $KNO_3$ was used in place of the 1M $NH_4NO_3$ solution containing 5% of $(NH_4)_2B_4O_7$ and the vitrification temperature was 950° C., thus obtaining a transparent glass rod of 10 mm$\phi$. This glass rod was drawn into a rod of 2 mm$\phi$, cut in a length of $\frac{1}{4} \times$(pitch length) and polished to obtain a rod lens having a very excellent light-condensing property.

EXAMPLE 5

An aqueous solution of 345 ml of a commercially sold aqueous solution of sodium silicate and 1555 ml of distilled water was passed through an ion exchange column filled with a cation exchange resin of Rexyn 101, R 231 to give an aqueous solution of silicic acid ($SiO_2$=about 6.6%; pH=2.5) and then poured in a cylindrical teflon vessel of 20 mm$\phi \times$50 mmH to which $CsNO_3$ was added to give a $CsNO_3/SiO_2$ weight ratio of 0.4. Thereafter, 1N $NH_4OH$ was further added with stirring to adjust the pH to 5.0. After allowed to stand at room temperature for one night, a gelled body was taken out of the vessel, leached at 80° C. for 1 hour with 1M $NH_4NO_3$ solution, immediately immersed in a solution of PrOH at 0° C., allowed to stand for one night, then dried gradually under reduced pressure, heated gradually up to 600° C. while a mixed gas of 80 vol % He - 20 vol % $O_2$ flowed around the body after the temperature exceeded 100° C., and further heated up to 1000° C. to thus obtain a transparent glass rod of 13 mm$\phi$. The resulting glass rod was drawn into a rod of 2 mm$\phi$, cut in a length of $\frac{1}{4} \times$(pitch length) longer than that of Example 4 and polished to prepare a rod lens. For the assessment of the light-condensing property, this rod was inserted in between a fiber and a large core diameter fiber of NA=0.15 to examine its insertion loss, which was less than 1.5.

EXAMPLE 6

In an analogous manner to Example 5, an aqueous solution of silicic acid was poured in a cylindrical teflon vessel to which $CsNO_3$ and $NH_4NO_3$ were added to give a $CsNO_3/SiO_2$ weight ratio of 0.3 and a $NH_4NO_3/SiO_2$ weight ratio of 0.3, followed by mixing adequately. Thereafter, 1N $NH_4OH$ was further added thereto with stirring to adjust the pH to 5.5. After allowed to stand at room temperature for one night, a gelled body was taken out of the vessel, leached at 80° C. for 1 hour with 1M $NH_4NO_3$ solution, immediately immersed in a solution of PrOH at 0° C. allowed to stand for one night, then dried gradually under reduced pressure, heated gradually up to 600° C. while a mixed gas of 80 vol % He - 20 vol % $O_2$ flowed around the body after the temperature exceeded 100° C., and further heated up to 1000° C. to thus obtain a transparent glass rod of 13 mm$\phi$. The resulting glass rod was drawn into a rod of 2 mm$\phi$, cut in a length of $\frac{1}{4} \times$(pitch length) and polished to prepare a rod lens. For the assessment of the light-condensing property, this rod was inserted in between a fiber and a large core diameter fiber of NA=0.15 to measure its insertion loss, which was less than 2 dB.

EXAMPLE 7

An aqueous solution of 345 ml of a commercially sold aqueous solution of sodium silicate and 1555 ml of distilled water was passed through an ion exchange column filled with a cation exchange resin of NH4 type to prepare an aqueous solution of ammonium silicate. This solution was poured in a cylindrical teflon vessel of 20 mm$\phi$×50 mmH and the pH was adjusted to 5.0 using 1M NH4OH. CsNO3 was then added thereto to give a CsNO3/SiO2 weight ratio of 0.4. Thereafter, 1N NH4OH was further added with stirring to adjust the pH to 5.0. After allowed to stand at room temperature for one night, a gelled body was taken out of the vessel, leached at 80° C. for 1 hour with 1M NH4NO3 solution, immediately immersed in a solution of PrOH at 0° C., allowed to stand for one night, then dried gradually under reduced pressure, heated slowly up to 600° C. while a mixed gas of 80 vol % He - 20 vol % O2 flowed around the body after the temperature exceeded 100° C., and further heated up to 1000° C. to thus obtain a transparent glass rod of 13 mm$\phi$. The resulting glass rod was drawn into a rod of 2 mm$\phi$, cut in a length of ¼×(pitch length) and polished to prepare a rod lens. For the assessment of the light-condensing property, this rod was inserted in between a fiber and a large core diameter fiber of NA=0.15 to measure the insertion loss, which was less than 2 dB.

EXAMPLE 8

In an analogous manner to Example 7, an aqueous solution of ammonium silicate was prepared and poured in a cylindrical teflon vessel to which CsNO3 was added to give a CsNO3/SiO2 weight ratio of 0.4, followed by mixing well. Thereafter, 0.5 1M HNO3 was further added thereto with stirring to adjust the pH to 5.0. After allowed to stand at room temperature for one night, a gelled body was taken out of the vessel, leached with pure water at 100° C. for 0.5 hour, immediately immersed in a solution of PrOH at 0° C., allowed to stand for one night, then dried gradually under reduced pressure, heated slowly up to 600° C. while a mixed gas of 80 vol % He - 20 vol % O2 started to flow around the body after the temperature exceeded 100° C., and further heated up to 1000° C. to thus obtain a transparent glass rod of 13 mm$\phi$. The resulting glass rod was drawn into a rod of 2 mm$\phi$, cut in a length of ¼×(pitch length) and polished to prepare a rod lens. For the assessment of the light-condensing property, this rod lens was inserted in between a large core diameter fiber of NA=0.15 and a fiber to measure the insertion loss, which was less than 1.5 dB.

EXAMPLE 9

A mixture of a quaternary ammonium silicate solution consisting of 10% NH4+-45% SiO2 - balance H2O and a cesium silicate solution consisting of 12% Cs2O -20% SiO2-balance H2O in a proportion of 30% - 70% was prepared, mixed with 10 g of formamide per 100 g of the alkali silicate, stirred and poured in a cylindrical teflon vessel of 20 mm$\phi$×50 mmH. After allowed to stand at room temperature for one night, a gelled body (17 mm$\phi$×45 mmH) was taken out of the vessel, leached with 1M NH4NO3 solution containing 5% of (NH4)2B4O7 at 50° C. for 2 hours, immediately immersed in a solution of PrOH at 0° C., allowed to stand for one night, then dried gradually under reduced pressure, heated slowly up to 600° C. while a mixed gas of 80 vol % - 20 vol % O2 started to flow around the body after the temperature exceeded 100° C., and further heated up to 1100° C. to thus obtain a transparent glass rod of 13 mm$\phi$. The resulting glass rod was drawn into a rod of 2 mm$\phi$, cut in a length of ¼×(pitch length) and polished to prepare a rod lens. For the assessment of the light-condensing property, this rod lens was inserted in between a large core diameter fiber of NA=0.15 and a fiber to measure the insertion loss, which was less than 2 dB.

EXAMPLE 10

The procedure of Example 9 was repeated except that 1M NH4NO3 solution containing 30% of KNO3 was used in place of the 1M NH4NO3 solution containing 5% of (NH4)2B4O7 and the vitrification temperature was adjusted to 950° C., thus obtaining a transparent glass rod of 13 mm$\phi$. This glass rod was similarly drawn, cut in a length of ¼×(pitch length) and polished to obtain a rod lens having a very excellent light-condensing property.

What is claimed is:

1. A process for the production of an optical glass article, which comprises:
    preparing an aqueous solution containing silicic acid or ammonium silicate,
    dissolving in the aqueous solution a water-soluble compound selected from the group consisting of thallium nitrate, cesium nitrate and rubidium nitrate,
    neutralizing the resulting aqueous solution,
    reacting the components of the aqueous solution at a temperature of from the freezing point to the boiling point of the aqueous solution in a time sufficient to polymerize silica and form an aggregated porous gelled body,
    immersing the gelled body in a leaching liquor selected from the group consisting of water, an aqueous solution of an acid, an aqueous solution of an alkali metal salt, a ketone and an alcohol,
    leaching a portion of the water-soluble compound in the form of ions from the gelled body to provide a concentration gradient of the water-soluble compound in the gelled body such that the concentration of the water-soluble compound decreases radially outwardly from the central part of the gelled body,
    drying the gelled body in a predetermined atmosphere,
    decomposing the water-soluble compound,
    heating and firing the gelled body at a temperature of 650° to 900° C., and
    sintering the gelled body at a temperature of 900° to 1450° C. to collapse micropores in the gelled body and form a transparent glass.

2. The process of claim 1, which further comprises immersing the gelled body in an organic solvent, between the leaching and drying steps.

3. The process of claim 1, wherein the aqueous solution containing silicic acid or ammonium silicate is an acidic aqueous solution of silicic acid or an acidic aqueous solution of ammonium silicate.

4. The process of claim 1, wherein the neutralizing is carried out to a pH of 4 to 6.

5. The process of claim 3, wherein the acidic aqueous solution is neutralized with an aqueous solution of $NH_4OH$.

6. The process of claim 1, wherein the aqueous solution containing silicic acid or ammonium silicate is an alkaline aqueous solution containing ammonium silicate.

7. The process of claim 6, wherein the alkaline aqueous solution is neutralized with an aqueous solution of $HNO_3$.

8. The process of claim 1, wherein the gelled body is formed by effecting gelling in a vessel with a desired shape.

9. The process of claim 1, wherein the gelled body is formed by working.

10. The process of claim 1, wherein the acid is an organic acid or inorganic acid.

11. The process of claim 10, wherein the organic acid is selected from the group consisting of formic acid and acetic acid.

12. The process of claim 10, wherein the inorganic acid is selected from the group consisting of hydrochloric acid, sulfuric acid, nitric acid and carbonic acid.

13. The process of claim 1, wherein the alkali metal salt is represented by the formula MX where $M=Li$, Na, K or $NH_4$ and $X=NO_3$, $(SO_3)_{\frac{1}{2}}$, $(CO_3)_{\frac{1}{2}}$ or Cl.

14. The process of claim 1, wherein the leaching is carried out at a temperature of from room temperature to the boiling point of the leaching liquor.

15. The process of claim 14, wherein the leaching is carried out at a temperature of 40° to 100° C.

16. The process of claim 1, wherein the drying is carried out at a temperature of 0° to 50° C. in vacuum.

17. The process of claim 1, wherein the decomposing is carried out at a temperature of 500° to 650° C. in vacuum.

18. The process of claim 1, wherein the heating and firing are carried out in dry air under reduced pressure or $O_2$ under reduced pressure.

19. The process of claim 1, wherein the sintering is carried out in vacuum, He or a mixture of $He+O_2$.

20. The process of claim 1, wherein the leaching liquor is a solution of 1-5% $HNO_3$+95-99% $C_2H_5OH$.

21. The process of claim 1, wherein the leaching liquor is an aqueous solution of 1M $NH_4NO_3$.

22. The process of claim 1, wherein the gelled body is formed in a cylindrical form before said immersing and said immersing includes immersing the gelled body in the leaching liquor to leach out a part of the water-soluble compound whereby the concentration distribution of an oxide of the water-soluble compound decreases radially outwardly from the central part of the glass article in the form of a square distribution.

* * * * *